(12) United States Patent
Banerjee et al.

(10) Patent No.: US 12,505,387 B1
(45) Date of Patent: Dec. 23, 2025

(54) SYSTEMS AND METHODS FOR FACILITATING DATA ACCESS BASED ON CRYPTOGRAPHIC DATA GENERATED USING FEDERATED LEARNING

(71) Applicant: EYGS LLP, London (GB)

(72) Inventors: Arindam Banerjee, Howrah (IN); Sanghamitra Gopen Pramanik, Kolkata (IN)

(73) Assignee: EYGS LLP, London (GB)

( * ) Notice: Subject to any disclaimer, the term of this patent is extended or adjusted under 35 U.S.C. 154(b) by 0 days.

(21) Appl. No.: 19/046,731

(22) Filed: Feb. 6, 2025

(51) Int. Cl.
*G06N 20/20* (2019.01)

(52) U.S. Cl.
CPC .................... *G06N 20/20* (2019.01)

(58) Field of Classification Search
CPC ........................................................ G06N 20/20
See application file for complete search history.

(56) References Cited

U.S. PATENT DOCUMENTS

2022/0238103 A1   7/2022   Madhusudhan et al.

OTHER PUBLICATIONS

Hasan, Nahid, et al. "An autoencoder-based confederated clustering leveraging a robust model fusion strategy for federated unsupervised learning." Information Fusion 115 (2024): 102751. (Year: 2024).*

Moe, Sa Jim Soe, et al. "Collaborative worker safety prediction mechanism using federated learning assisted edge intelligence in outdoor construction environment." IEEE Access 11 (2023): 109010-109026. (Year: 2023).*

Chai, Zhilei, et al. "A semi-supervised auto-encoder using label and sparse regularizations for classification." Applied Soft Computing 77 (2019): 205-217. (Year: 2019).*

Shi, Jibo, et al. "LrFedIF: Low-Resource Federated Learning Based on Fingerprint Feature Imitation for Signal Recognition in Non-IID Scenarios." China Conference on Command and Control. Singapore: Springer Nature Singapore, 2023. (Year: 2023).*

Bengesi, S. et al., "Advancements in Generative AI: A Comprehensive Review of GANs, GPT, Autoencoders, Diffusion Model, and Transformers," IEEE Access, May 6, 2024, vol. 12, pp. 69812-69837.

Cao, H. et al., "A Survey on Generative Diffusion Models," arXiv:2209.02646, Dec. 23, 2023. Retrieved from https://arxiv.org/pdf/2209.02646, [retrieved on Feb. 27, 2025]; 25 pages.

(Continued)

*Primary Examiner* — Michael J Huntley
*Assistant Examiner* — Sehwan Kim
(74) *Attorney, Agent, or Firm* — COOLEY LLP

(57) ABSTRACT

A method includes receiving, at a first compute device, a latent vector from a first machine learning model associated with a plurality of compute devices that includes the first compute device. The latent vector is provided as input to a second machine learning model to produce a predicted topic vector and a predicted cryptographic key. The predicted cryptographic key is compared to a cryptographic key to produce a first similarity metric value. The predicted topic vector is compared to a plurality to topic vectors of a database to produce a plurality of second similarity metric values. Embedded user data is received from a second compute device from the plurality of compute devices, and context data is sent from the database to the second compute device based on the embedded user data.

20 Claims, 9 Drawing Sheets

(56) References Cited

OTHER PUBLICATIONS

Gill, W. et al., "Privacy-Aware Semantic Cache for Large Language Models," arXiv:2403.02694, Mar. 5, 2024. Retrieved from https://arxiv.org/pdf/2403.02694v1, [retrieved on Feb. 27, 2025]; 12 pages.
Wang, H. et al., "RVAE-LAMOL: Residual Variational Autoencoder to Enhance Lifelong Language Learning," arXiv:2205.10857, May 22, 2022. Retrieved from https://arxiv.org/pdf/2205.10857, [retrieved on Feb. 27, 2025]; 9 pages.
Zipperling, D. et al., "CollaFuse: Navigating Limited Resources and Privacy in Collaborative Generative AI," arXiv:2402.19105, Aug. 16, 2024. Retrieved from https://arxiv.org/pdf/2402.19105, [retrieved on Feb. 27, 2025]; 8 pages.

\* cited by examiner

700

```
┌─────────────────────────────────────────────────────────┐
│ Receive, at a processor of a first compute device, a   │
│ latent vector from a first machine learning model      │
│ associated with a plurality of compute devices that    │
│ includes the first compute device                       │
│ 702                                                     │
└─────────────────────────────────────────────────────────┘
                            ↓
┌─────────────────────────────────────────────────────────┐
│ Provide, via the processor, the latent vector as input │
│ to a second machine learning model to produce a        │
│ predicted topic vector and a predicted cryptographic   │
│ key                                                     │
│ 704                                                     │
└─────────────────────────────────────────────────────────┘
                            ↓
┌─────────────────────────────────────────────────────────┐
│ Compare, via the processor, the predicted cryptographic │
│ key to a cryptographic key accessible by the first     │
│ compute device and not remaining compute devices from  │
│ the plurality of compute devices, to produce a first   │
│ similarity metric value                                 │
│ 706                                                     │
└─────────────────────────────────────────────────────────┘
                            ↓
┌─────────────────────────────────────────────────────────┐
│ In response to the first similarity metric value being │
│ less than a first threshold value, compare, via the    │
│ processor, the predicted topic vector to a plurality to│
│ topic vectors of a database accessible by the first    │
│ compute device and not remaining compute devices from  │
│ the plurality of compute devices, to produce a         │
│ plurality of second similarity metric values            │
│ 708                                                     │
└─────────────────────────────────────────────────────────┘
                            ↓
┌─────────────────────────────────────────────────────────┐
│ In response to at least one second similarity metric   │
│ value from the plurality of second similarity metric   │
│ values being less than a second threshold value,       │
│ receive, via the processor, embedded user data from a  │
│ second compute device from the plurality of compute    │
│ devices                                                 │
│ 710                                                     │
└─────────────────────────────────────────────────────────┘
                            ↓
┌─────────────────────────────────────────────────────────┐
│ Cause, via the processor, context data to be sent from │
│ the database to the second compute device based on the │
│ embedded user data                                      │
│ 712                                                     │
└─────────────────────────────────────────────────────────┘
```

FIG. 7

SYSTEMS AND METHODS FOR FACILITATING DATA ACCESS BASED ON CRYPTOGRAPHIC DATA GENERATED USING FEDERATED LEARNING

FIELD

One or more embodiments described herein relate to systems and computerized methods for facilitating secure data access based on machine learning models trained using a federated learning approach.

BACKGROUND

Some known techniques for managing data usage across multiple data owners, such as some known data mesh techniques, are susceptible to data leakage, particularly where a machine learning model is trained based on data associated with more than one data owner. For example, a data owner can lack control over the output of some such machine learning models, resulting in a machine learning model revealing the data owner's information for a purpose not desired nor authorized by the data owner.

A need therefore exists for systems and methods configured to promote data integration across a plurality of data owners while permitting each data owner to restrict access and use of their data.

SUMMARY

According to an embodiment, a non-transitory, processor-readable medium stores instructions that, when executed by a processor, cause the processor to generate topic metadata based on data received from a database. The instructions further cause the processor to use the topic metadata and a first cryptographic key to train a first machine learning model to predict, in response to the first machine learning model receiving the topic metadata, (1) the topic metadata and (2) the first cryptographic key, producing a trained first machine learning model. The trained first machine learning model is split to produce a second machine learning model and a third machine learning model. The instructions further cause the processor to perform federated averaging of a plurality of weights from a plurality of second machine learning models that includes the second machine learning model. As a result, a fourth machine learning model is trained to encode user input data received from a user compute device to produce, without providing the data to the fourth machine learning model, encoded data. This encoded data, in response to being provided to the third machine learning model, causes the third machine learning model to produce a second cryptographic key that is compared to the first cryptographic key to provide the data to the user compute device.

According to an embodiment, a method includes receiving, at a processor of a first compute device, a latent vector from a first machine learning model associated with a plurality of compute devices that includes the first compute device. The method further includes providing, via the processor, the latent vector as input to a second machine learning model to produce a predicted topic vector and a predicted cryptographic key. The predicted cryptographic key is compared, via the processor, to a cryptographic key accessible by the first compute device and not remaining compute devices from the plurality of compute devices, to produce a first similarity metric value. In response to the first similarity metric value being less than a first threshold value, the method includes comparing, via the processor, the predicted topic vector to a plurality to topic vectors of a database accessible by the first compute device and not remaining compute devices from the plurality of compute devices, to produce a plurality of second similarity metric values. In response to at least one second similarity metric value from the plurality of second similarity metric values being less than a second threshold value, embedded user data is received, via the processor, from a second compute device from the plurality of compute devices. The method further causes, via the processor, context data to be sent from the database to the second compute device based on the embedded user data.

According to an embodiment, a non-transitory, processor-readable medium stores instructions that, when executed by a processor, cause the processor to receive user input data from a first user compute device and provide the user input data as input to a first machine learning model to produce classification data. The classification data is provided as input to a second machine learning model to produce a latent vector. The instructions further cause the processor to cause the latent vector to be sent to a plurality of third machine learning models that is to be executed at a plurality of second user compute devices that excludes the first user compute device and that receives the latent vector as input to produce a plurality of predicted topic vectors and a plurality of predicted cryptographic keys in response to receiving the latent vector. Additionally, the instructions cause the processor to receive, from a second user compute device from the plurality of second user compute devices, an indication that a cryptographic key associated with the second user compute device is within a predetermined distance of a predicted cryptographic key that is (1) from the plurality of predicted cryptographic keys and (2) produced by a third machine learning model (a) executed at the second user compute device and (b) from the plurality of third machine learning models. In response to receiving the indication that the cryptographic key is within a predetermined distance of the predicted cryptographic key, the user input data is provided as input to a fourth machine learning model that produces embedded user input data in response to receiving the user input data. The embedded user input data is sent to a database associated with the second user compute device, and in response to causing the embedded user input data to be sent to the database, context data is received from the database. The context data is provided as input to a fifth machine learning model that generates response data in response to receiving the context data, and the response data is displayed at the first user compute device.

BRIEF DESCRIPTION OF THE DRAWINGS

FIG. 7 shows a flow diagram illustrating a method implemented by a data access system to cause context data to be sent to a compute device, according to an embodiment.

DETAILED DESCRIPTION

Some known generative machine learning models engender privacy and security concerns, preventing adoption of these models in decentralized and/or consortium systems, such as a data marketplace that permits members of the marketplace to collaborate. For example, a machine learning model trained based on the collective data of the consortium can release private and/or sensitive data to a party and/or for a purpose that is unauthorized by or undesirable to the member that owns (or is otherwise responsible for) that private and/or sensitive data. Alternatively or in addition, the machine learning model can include a modified version of the private/sensitive data in the machine learning model's output and/or can produce an output that is informed by the private/sensitive data. In instances where the machine learning model includes a generative model (e.g., a large language model (LLM) and/or the like), a malicious actor can extract member data that should otherwise be protected by crafting an input to prompt the generative model to reveal the member data.

At least some systems and methods described herein permit a consortium member to maintain custody and governance over that member's data, increasing privacy and security. At least some systems and methods described herein moreover permit a member to abstract that member's data when another member attempts to access the data, until the other member has been verified. In some implementations, as described herein, a member can have access privileges to cause relevant context data (and not other context data that is not authorized by the access privilege) to be retrieved from a member's database (e.g., and to a context window of a generative model). As a result, at least some systems and methods described herein permit a user to access consortium data via a machine learning model while also permitting consortium members to expose only relevant and/or authorized data to the user.

A consortium can include, for example, a plurality of entities (e.g., organizations) from a common industry (e.g., banking, retail, etc.). In some instances, a consortium can include a plurality of entities associated with a common platform (e.g., a smart city having a plurality of networks each controlled by a different entity, such as a vehicle network, an infrastructure network, a communications network, etc.). Alternatively or in addition, a consortium can include a plurality of entities having a common purpose (e.g., environmental, social, and governance (ESG)) and a desire to share data to achieve that common purpose. In some instances, a consortium can include an organization, and consortium members can include subsidiaries of the organization.

Figure 1:
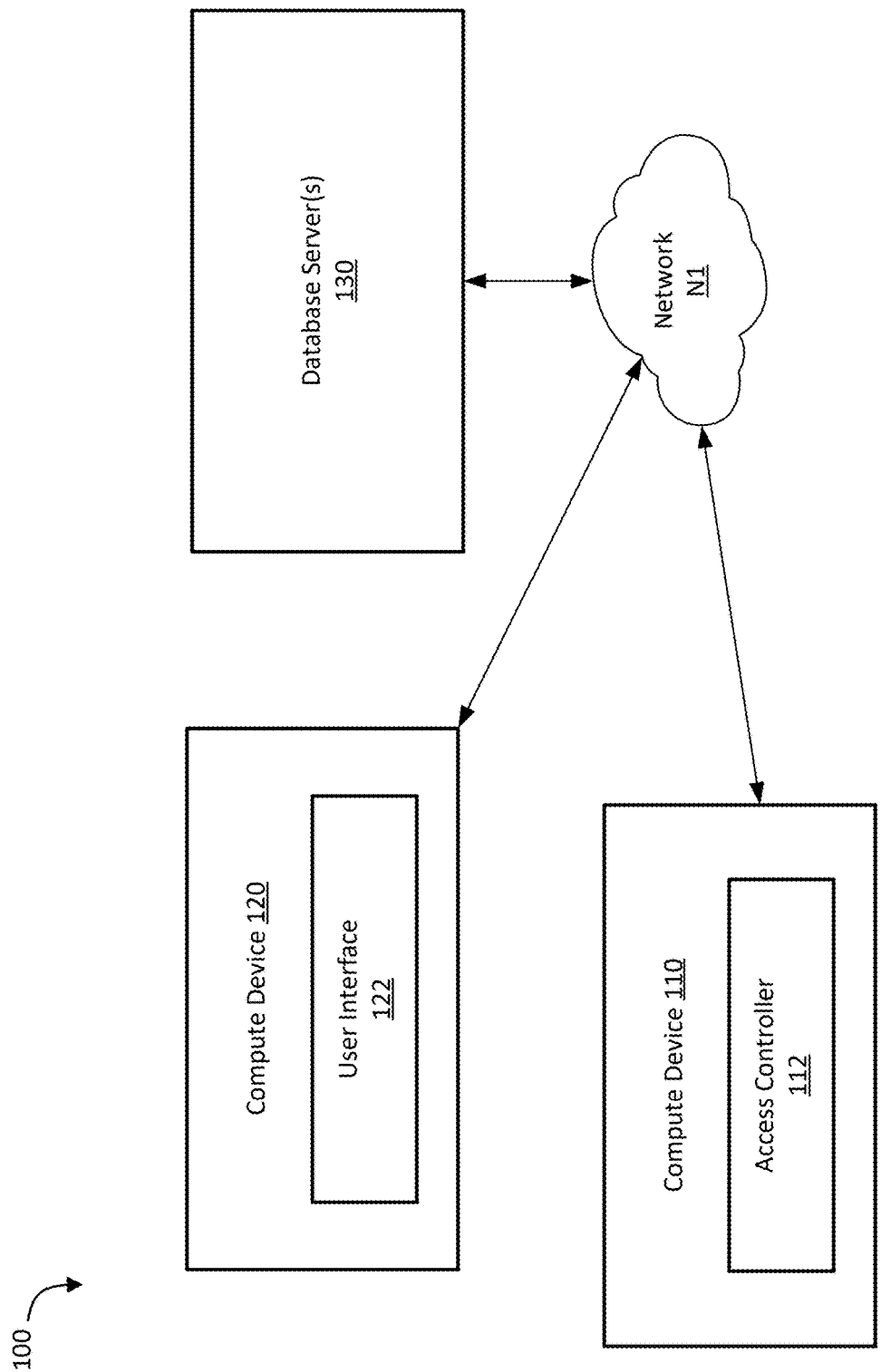
FIG. 1 shows a system block diagram of a data access system, according to an embodiment.

FIG. 1 shows a system block diagram of a data access system 100, according to an embodiment. The data access system 100 includes a compute device 110, a compute device 120, a database server(s) 130, and a network N1. The data access system 100 can include alternative configurations, and various steps and/or functions of the processes described below can be shared among the various devices of the data access system 100 or can be assigned to specific devices (e.g., the compute device 110, the compute device 120, and/or the like). For example, in some configurations, a user can provide inputs directly to the compute device 110 rather than via the compute device 120, as described herein.

In some embodiments, the compute device 110, the compute device 120, and/or the database server(s) 130 can include any suitable hardware-based computing devices and/or multimedia devices, such as, for example, a server, a desktop compute device, a smartphone, a tablet, a wearable device, a laptop and/or the like. In some implementations, the compute device 110, the compute device 120, and/or the database server(s) 130 can be implemented at an edge (e.g., with respect to the network N1) node or other remote (e.g., with respect to the network N1) computing facility and/or device. In some implementations, each of the compute device 110, the compute device 120, and/or the database server(s) 130 can be (or be included in) a data center or other control facility and/or device configured to run and/or execute a distributed computing system and can communicate with other compute devices.

The compute device 110 can include an access controller 112, which can include software (1) stored at a memory that is functionally and/or structurally similar to the memory 210 of FIG. 2 discussed below and (2) executed via a processor that is functionally and/or structurally similar to the processor 220 of FIG. 2 discussed below. The access controller 112 can be configured to retrieve data from databases based on user queries and access privileges, as described further herein.

The compute device 120 can implement a user interface 122, which can include a graphical user interface (GUI) (e.g., displayed on a monitor/display) that is configured to receive input data (e.g., user input queries) from a user via an input device (not shown). The user interface 122 via a display (not shown) can further cause display of output data generated by the access controller 112 (e.g., responses to user input queries, generated by a generative machine learning model). The user interface 122 can be implemented via software and/or hardware.

The database server(s) 130 can implement a database, which can include a collection of data configured for retrieval and storage. More specifically, the database server(s) can execute database management software such as, for example, MySQL, PostgreSQL®, MongoDB®, and/or the like. In some instances, the database can be configured for semantic search.

The compute device 110 can be networked and/or communicatively coupled to the compute device 120 and/or the database server(s) 130, via the network N1, using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s).

In some implementations, although not shown in FIG. 1, the data access system 100 can include multiple compute devices 110, compute devices 120, and/or database servers 130. For example, in some implementations, the data access system 100 can include multiple compute devices 110, where each compute device 110 can be associated with a different user from a plurality of users. In some implementations, multiple compute devices 110 can be associated with a single user, where each compute device 110 can be associated with, for example, a different input modality (e.g., text input, audio input, video input, etc.). Some implementations can include various combinations of the above.

Figure 2:
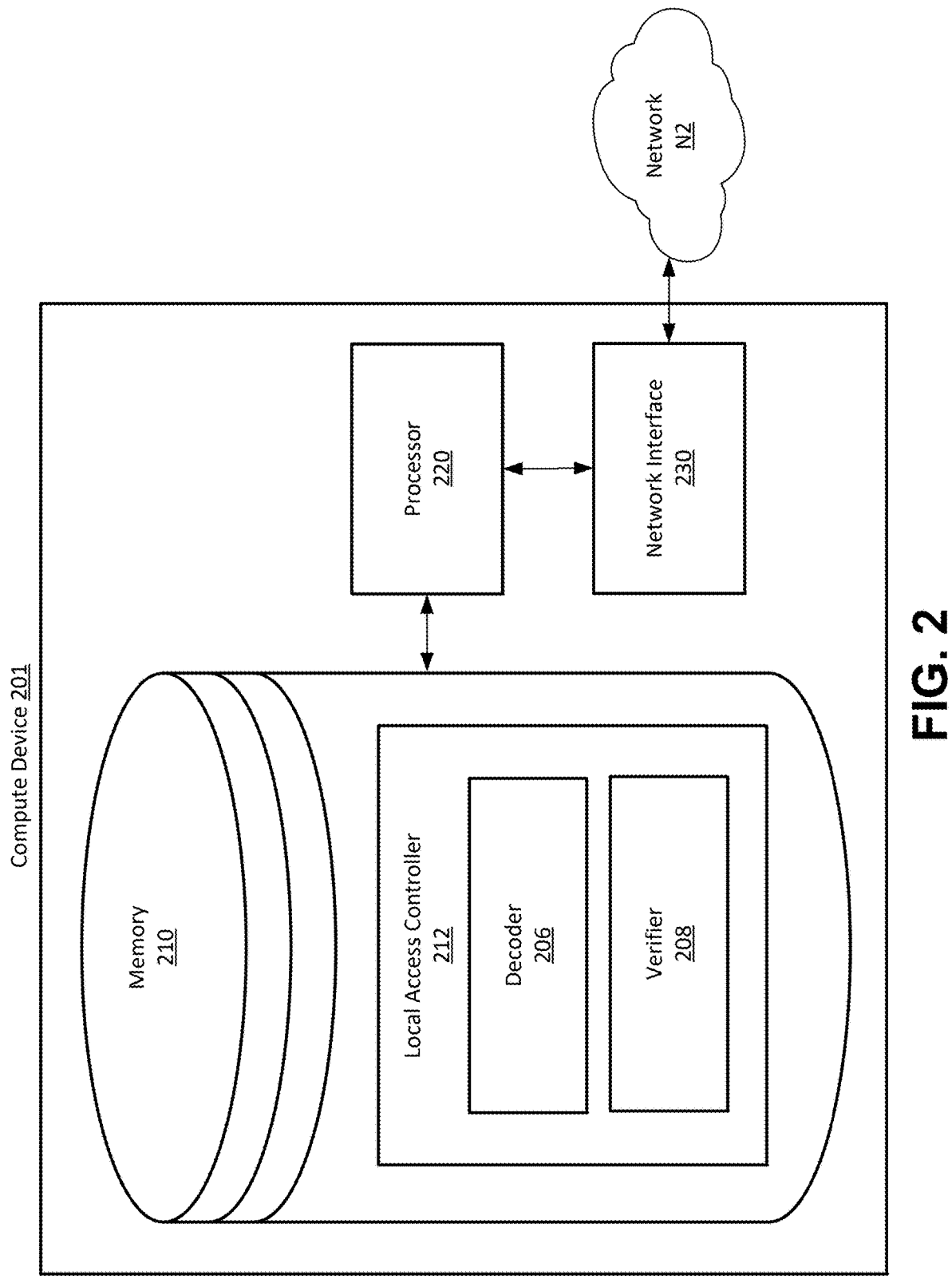
FIG. 2 shows a system block diagram of a compute device included in a data access system, according to an embodiment.

FIG. 2 shows a system block diagram of a compute device 201 included in a data access system, according to an embodiment. The compute device 201 can be structurally and/or functionally similar to, for example, the compute device 110 and/or 120 and/or the database server(s) 130 of the data access system 100 shown in FIG. 1. The compute device 201 can be a hardware-based computing device, a multimedia device, or a cloud-based device such as, for example, a computer, a server, a desktop computer, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure, and/or the like. The processor 220 is operatively coupled to the memory 210. In some embodiments, for example, the processor 220 can be coupled to the memory 210 through a system bus (for example, address bus, data bus and/or control bus). In some implementations, the processor 220 can include multiple parallelly arranged processors.

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server can be operatively coupled to the compute device 201.

The memory 210 can store various instructions associated with processes, algorithms and/or data, as described herein. Memory 210 can further include any non-transitory computer-readable storage medium for storing data and/or software that is executable by processor 220, and/or any other medium which may be used to store information that may be accessed by processor 220 to control the operation of the compute device 201. For example, the memory 210 can store data associated with a local access controller 212. The local access controller 212 can be functionally and/or structurally similar to the local access controller 312 of FIG. 3 (described herein). An access controller that is functionally and/or structurally similar to the access controller 112 of FIG. 1 can include the local access controller 212.

Figure 3:
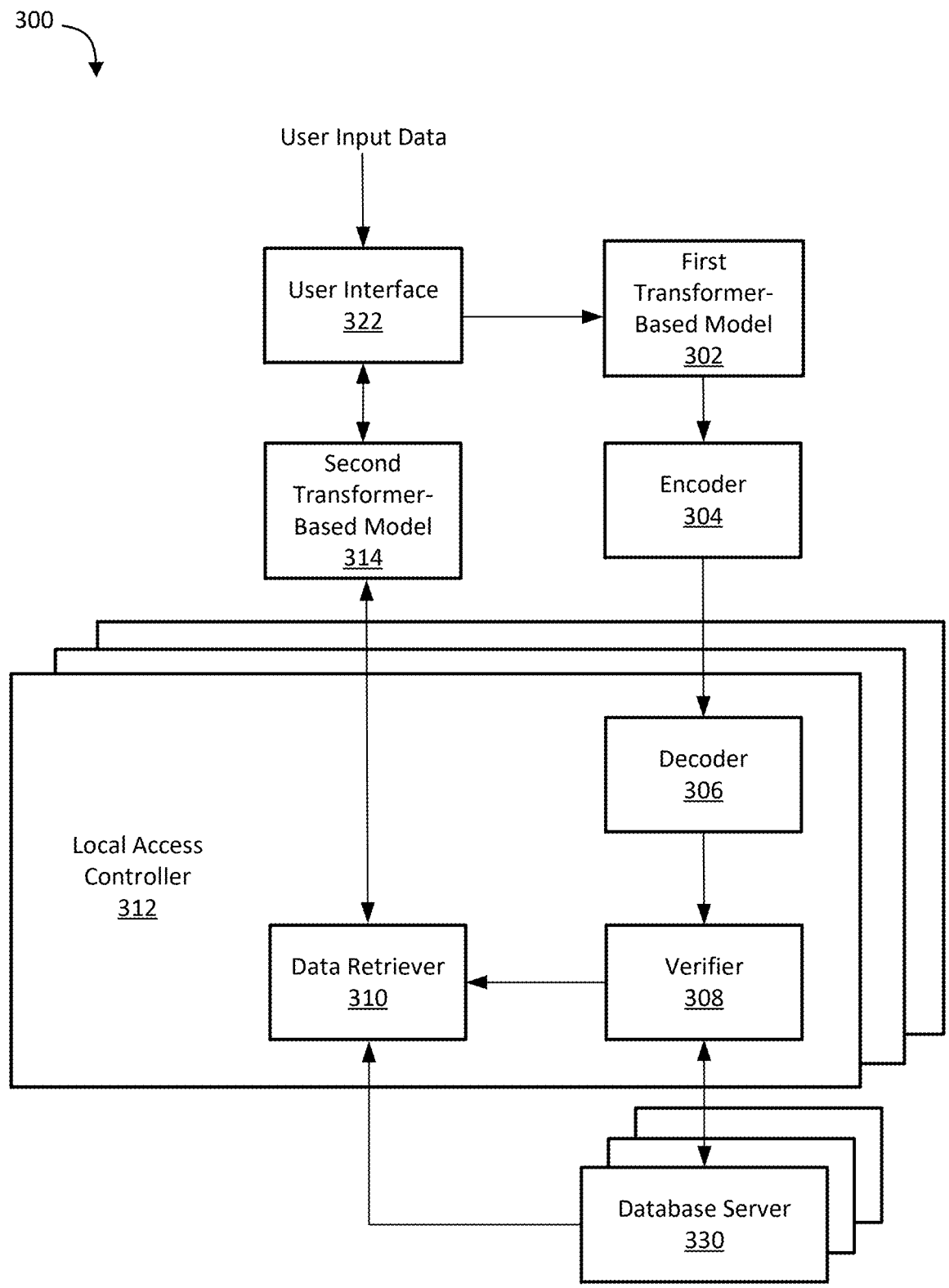
FIG. 3 shows a system block diagram of data access components included in a data access system, according to an embodiment.
Figure 4:
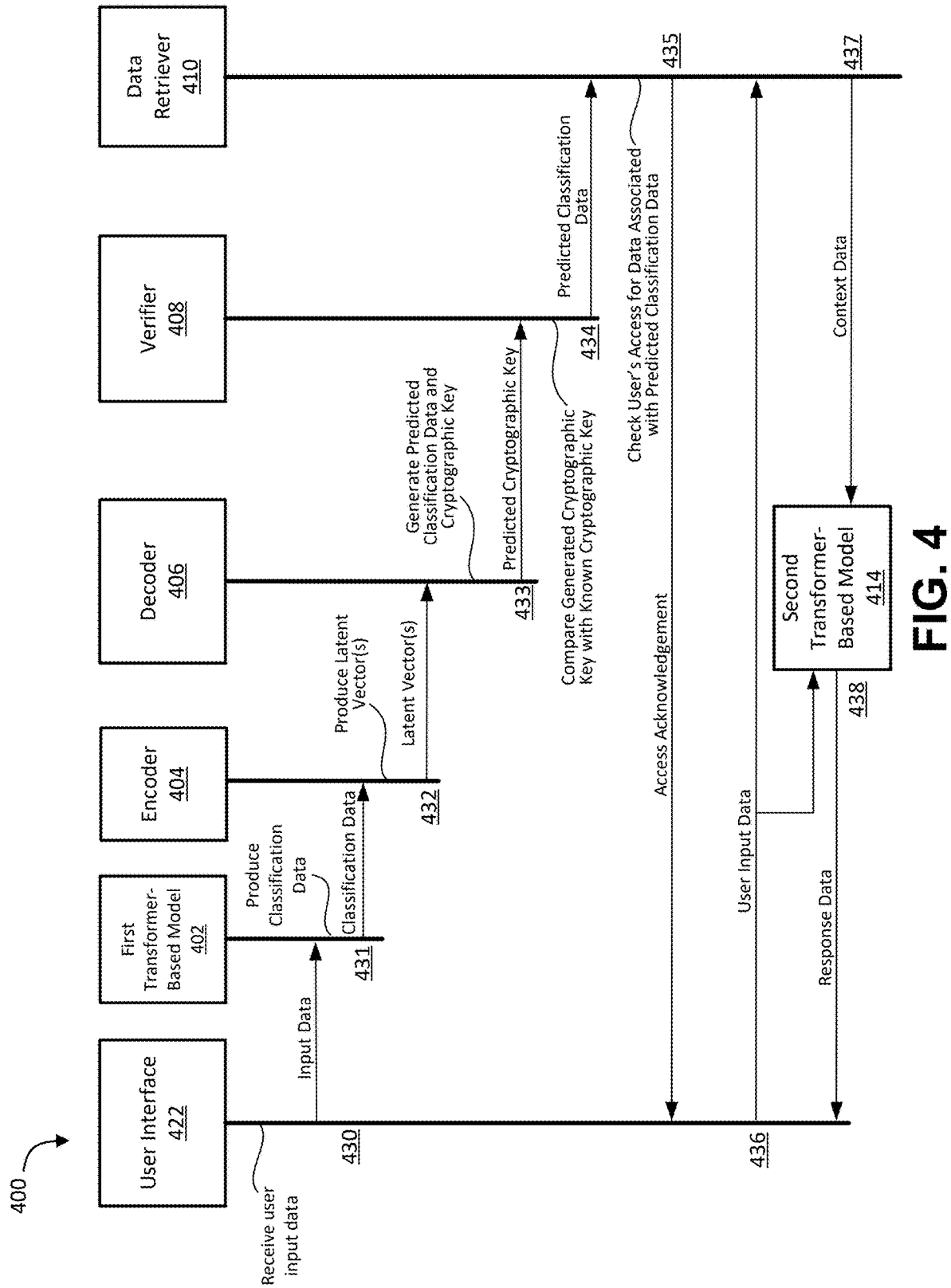
FIG. 4 shows a swim lane diagram of interactions facilitated by a data access system, according to an embodiment.

The local access controller 212 includes a decoder 206, which can be functionally and/or structurally similar to the decoder 306 of FIG. 3 and/or the decoder 406 of FIG. 4, each of which is described further herein. The local access controller 212 further includes a verifier 208, which can be functionally and/or structurally similar to the verifier 308 of FIG. 3, and/or the verifier 408 of FIG. 4, each of which is described further herein.

The network interface 230 can be configured to connect to the network N2, which can be functionally and/or structurally similar to the network N1 of FIG. 1. For example, network N2 can use any of the communication protocols described above with respect to network N1 of FIG. 1.

In some instances, the compute device 201 can further include a display, an input device, and/or an output interface (not shown in FIG. 2). The display can be for example any display device (e.g., a monitor, screen, etc.) by which the compute device 201 can output and/or display data (e.g., via a user interface that is structurally and/or functionally similar to the user interface 122 of FIG. 1). The input device can include for example a mouse, keyboard, touch screen, voice interface, and/or any other hand-held controller or device or interface via which a user may interact with the compute device 201. The output interface can include for example a bus, port, and/or other interfaces by which the compute device 201 can connect to and/or output data to other devices and/or peripherals.

FIG. 3 shows a system block diagram of data access components 300 included in a data access system, according to an embodiment. The data access components 300 can be associated with a compute device (e.g., a compute device that is structurally and/or functionally similar to the compute device 201 of FIG. 2 and/or the compute devices 110 and 120 of FIG. 1). For example, the data access components 300 can be included in and/or associated with (1) access controller 112 of FIG. 1 and/or (2) the local access controller 212 of FIG. 2. In some instances, the data access components 300 can include software stored in memory 210 and configured to execute via the processor 220 of FIG. 2. In some instances, at least a portion of the data access components 300 can be implemented in hardware (e.g., an ASIC).

The data access components 300 receive user input data (described herein) as input via a user interface 322 (e.g., that is functionally and/or structurally similar to the user interface 122 of FIG. 1). The data access components 300 further include a first transformer-based model 302 (e.g., that is functionally and/or structurally similar to the first transformer-based model 402 of FIG. 4), an encoder 304 (e.g., that is functionally and/or structurally similar to the encoder 404 of FIG. 4 and/or the trained global encoder 514 of FIG. 5), a local access controller 312 (e.g., that is functionally and/or structurally similar to the local access controller 212 of FIG. 2), a second transformer-based model 314 (e.g., that is functionally and/or structurally similar to the second transformer-based model 414 of FIG. 4), and a database server 330 (e.g., that is functionally and/or structurally similar to the database server(s) 130 of FIG. 1). The local access controller 312 includes a decoder 306 (e.g., that is functionally and/or structurally similar to the decoder 406 of FIG. 4 and/or the trained local decoder 516 of FIG. 5), a verifier 308 (e.g., that is functionally and/or structurally similar to the verifier 408 of FIG. 4), and a data retriever 310 (e.g., that is functionally and/or structurally similar to the data retriever 410 of FIG. 4).

A user can provide the user input data that includes and/or represents, for example, a query in natural language. The query can include a request that involves data stored within the database server 330. For example, a user can ask, "What is Department X's revenue?" The query can be provided as input to the first transformer-based model 302. The first transformer-based model 302 can include a large language model (LLM) and/or a similar machine learning model configured to infer a topic(s) (e.g., "Department X revenue") for the input query. The first transformer-based model 302 can output classification data (e.g., an indication of the topic(s), such as a string(s)), which can be received as input by the encoder 304.

The encoder 304 can include a machine learning model (e.g., a deep neural network) configured (e.g., parameterized, as described herein at least in relation to FIG. 3) to encode the classification data (e.g., the indication of the topic(s)) into a latent space, producing a latent vector(s) (e.g., a latent vector for each topic represented in the classification data). The encoder 304 can be configured to broadcast the latent vector(s), such that each local access controller, including the local access controller 312, from a group of local access controllers 312, receive the latent vector(s). Each local access controller can be associated with a different consortium member (e.g., Department X, Department Y, Department Z, etc.) included within a consortium (e.g., an organization). In some implementations, each local access controller can be implemented by a different server associated with the given consortium member.

Figure 5:
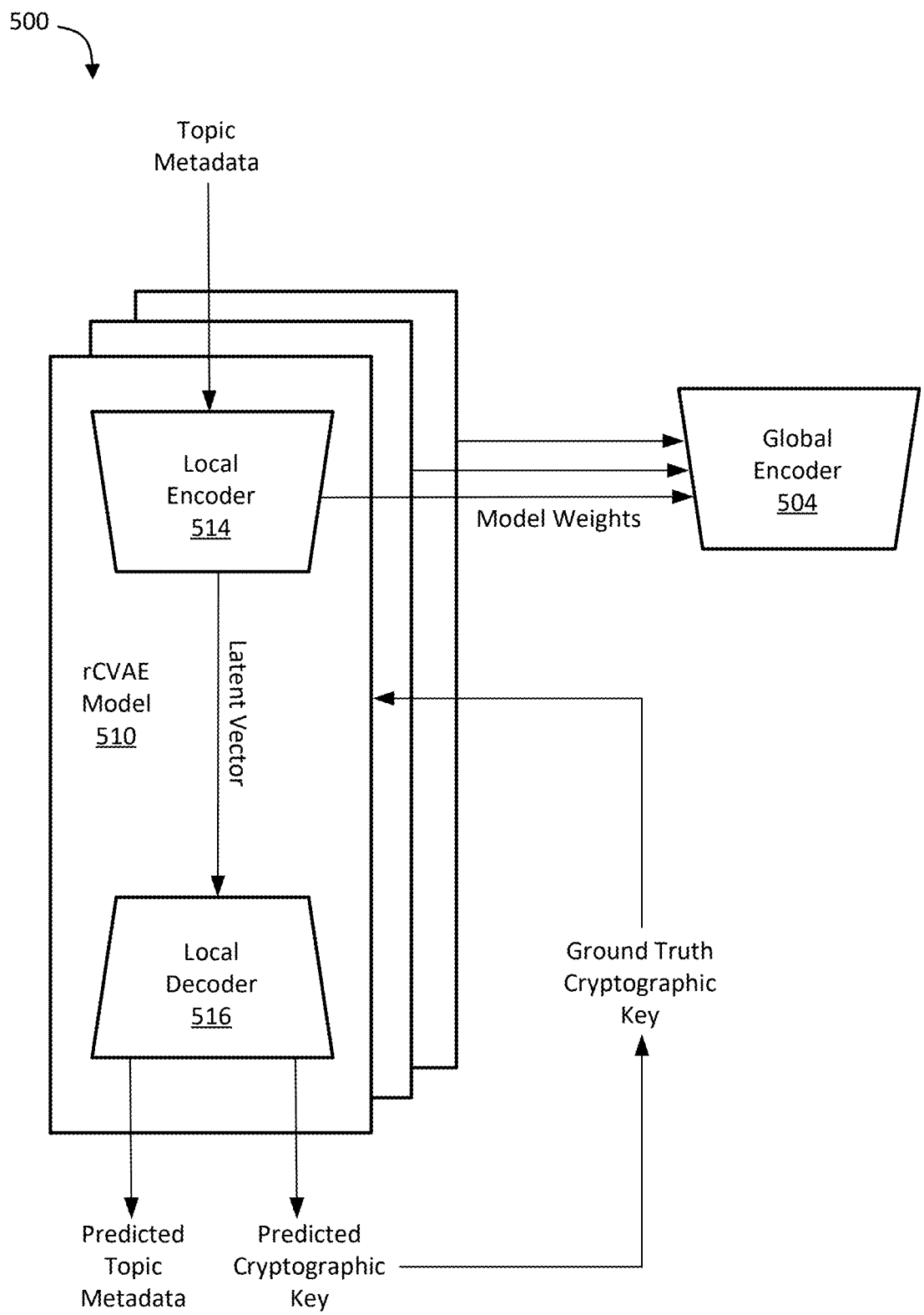
FIG. 5 shows training components for training a plurality of machine learning models executed via a data access system, according to an embodiment.

Each local access controller can include a decoder (e.g., a deep neural network) that is uniquely trained as compared to decoders from remaining local access controllers from the group of local access controllers, as described further herein at least in relation to FIG. 5. For example, each decoder can be trained to decode a received latent vector to approximate (e.g., predict) (1) the topic represented by the latent vector and (2) a cryptographic key associated with the consortium member that is associated with a given decoder. The decoder can be trained to produce the approximation of the cryptographic key only if the topic is associated with the consortium member associated with that member, as described further herein at least in relation to FIG. 5. For example, the local access controller 312 can be associated with Department X, and when decoding the latent vector representing the topic "Department X revenue," the decoder 306 can be configured to approximate a cryptographic key that is known to Department X and not remaining consortium members. Conversely, decoders from other local access controllers will not be trained to produce the approximation of the cryptographic key when decoding the latent vector representing that topic, since that topic is not associated with and/or intended for those consortium members (e.g., other departments). In some implementations, the cryptographic key can include a continuous vector, as described further herein. In some implementations, the decoder 306 can be configured to concatenate approximated classification data (representing an approximated topic) and an approximated cryptographic key generated for that approximated classification data, producing concatenation data.

The verifier 308 is configured to determine a difference (e.g., a cosine distance and/or a similar similarity metric) between the approximated cryptographic key produced by the decoder 306 and a known (e.g., but secret to the consortium member) cryptographic key. If this difference is, for example, less than a predefined threshold value for at least a predetermined number (or predetermined ratio) of cryptographic keys approximated by the decoder 306 when approximating the latent vectors, the verifier 308 can confirm that the topic (and thus the user query) is intended for the consortium member associated with the local access controller 312. Otherwise, if fewer than the predetermined number of approximated cryptographic keys have difference below the predetermined threshold value (or if the ratio of these approximated cryptographic keys is below a threshold ratio), the verifier 308 can determine that the topic is not associated with the consortium member, and the latent vectors can be discarded.

An example of a process implemented by the verifier 308 is shown below:

Verifier algorithm:
Input: Embedding vector of actual key phrase, embedding vector of key phrase extracted from the broadcasted vectors, threshold δ
Output: yes/no (I/O)
i. count: ={ }
ii. embkp: =Embedding vector of the actual key phrase
iii. for each topic t in broadcasted topics do:
embkpe: =Embedding vector of the key phrase extracted from the broadcasted vectors
iv. dist: =cosine_distance (embkp, embkpe)
v. if dist<δ:
vi. count←count U {1}
vii. else:
viii. count←count U {0}
ix. end for
x. return mode (count)

Once the verifier 308 confirms that the approximated cryptographic key phrase(s) belong to the consortium member, the verifier 308 can be further configured to determine the difference (e.g., cosine distance) between actual topics stored within the database server 330 and the approximated topic predicted by the decoder 306. The database server 330 can be associated with (e.g., controlled by, private to, etc.) the consortium member and can store an index of topics (e.g., represented by topic semantic vectors) associated with the data stored at the database server 330. If the difference is less than a threshold value, the verifier 308 can select a predetermined number of topics having the lowest difference and, furthermore, can authenticate the user's privileges (e.g., by validating credential data) to access those topics.

If the user's privileges indicate that the user is granted access to the topics identified by the verifier 308, the data retriever 310 can be configured to cause the user interface 322 to send the user input data to the data retriever 310 (e.g., as further described at least in relation to FIG. 4, described herein). The data retriever 310 can use the user input data to perform a refined search of the data within the database server 330 (e.g., by converting the user input data into a semantic vector that can be used in semantic search). The data retriever 310 can retrieve data associated with the user input data (referred to for example as context data) from the database server 330 and can include the context data in a context window of the second transformer-based model 314. The second transformer-based model 314 can include a generative model, such as a large language model (LLM) and/or the like. The user interface 322 can also add the user input query to the context window, such that the second transformer-based model 314 can produce a response to the user input query based on the context data. In some implementations, although not shown in FIG. 3, the first transformer-based model 302 and the second transformer-based model 314 can be the same model (e.g., and accessed at different times of a process implemented by the data access components 300). The generated response can be displayed (and/or audibly communicated, etc.) to the user via the user interface 322.

FIG. 4 shows a swim lane diagram of interactions 430-438 facilitated by a data access system, according to an embodiment. The data access system can be functionally and/or structurally similar to the data access system 100 of FIG. 1. The data access system includes components that are functionally and/or structurally similar to the data access components 300 of FIG. 3. More specifically, the components include a user interface 422 (e.g., that is functionally and/or structurally similar to the user interface 122 of FIG. 1 and/or the user interface 322 of FIG. 3), a first transformer-based model 402 (e.g., that is functionally and/or structurally similar to the first transformer-based model 302 of FIG. 3), an encoder 404 (e.g., that is functionally and/or structurally similar to the encoder 304 of FIG. 3 and/or the trained global encoder 514 of FIG. 5), a decoder 406 (e.g., that is functionally and/or structurally similar to the decoder 306 of FIG. 3 and/or the trained local decoder 516 of FIG. 5), a verifier 408 (e.g., that is functionally and/or structurally similar to the verifier 308 of FIG. 3), a data retriever 410 (e.g., that is functionally and/or structurally similar to the data retriever 310 of FIG. 3), and a second transformer-based model 414 (e.g., that is functionally and/or structurally similar to the second transformer-based model 314 of FIG. 3).

The user interface 422 receives user input data and, at 430, sends the input data to the first transformer-based model 402. In response to receiving the input data as input, the first transformer-based model 402 produces classification data (e.g., that indicates at least one topic of the input data), which is sent to the encoder 404 at 431. The encoder 404 produces a latent vector for each topic from the at least one topic represented by the classification data, and the latent vector(s) are provided to the consortium member-specific decoder 406 (and other decoders within the consortium, not shown in FIG. 4) at 432. The decoder 406 generates predicted classification data and a cryptographic key, and at 433, the predicted cryptographic key is received by the verifier 408, which compares the cryptographic key with a known cryptographic key associated with a given consortium member (and not remaining consortium members). Based on this comparison suggesting a match, at 434, the data retriever 410 receives the predicted classification data. The data retriever 410 then retrieves topic data from a database (e.g., a consortium member-specific database that is functionally and/or structurally similar to the database server 330 of FIG. 3) based on a similarity between the topic data and the predicted classification data.

The data retriever 410 can then validate the user's credentials to access the data stored within the database and associated with the topic data. After validation, at 435, the data retriever 410 sends to the user interface 422 an acknowledgement that the user has been granted access to the data stored within the database. In response to receiving the access acknowledgment, at 436, the user interface 422 sends the user input data to both (1) a context window of the second transformer-based model 414 and the data retriever 410. The data retriever 410 can perform a refined search (e.g., as compared to the topic identification performed prior to 435) for data within the database that is responsive to the user query. At 437, the data retriever 410 can return data resulting from the refined search of the database to the context window of the second transformer-based model 414. At 438, the second transformer-based model 414 provides a generated response to the user interface 422, which can be displayed (or otherwise communicated) to the user.

Having discussed above the inference phase of the models, the training phase will now be discussed with respect to FIG. 5. FIG. 5 shows training components 500 for training a plurality of machine learning models executed via a data access system, according to an embodiment. The training components 500 can be implemented by a data access system (e.g., that is functionally and/or structurally similar to the data access system 100 of FIG. 1). Alternatively or in addition, the training components 500 can be implemented by a separate system configured to facilitate model training (e.g., via a graphics processing unit(s) (GPU(s)) to produce trained machine learning models, which can then be implemented (e.g., for use in inferencing) by the data access system. In some instances, the training components 500 can include software stored in memory and configured to execute via a processor. In some instances, at least a portion of the training components 500 can be implemented in hardware (e.g., an ASIC). The training components include a reverse conditional variational autoencoder (rCVAE) model 510 and a global encoder 504. The rCVAE model 510 includes a local encoder 514 and a local decoder 516.

The training components 500 receive input data from a data collection. In some instances, the data collection can include a data catalog having metadata that identifies and/or describes the member's inventory of sharable data assets. For example, metadata can include topic metadata (e.g., a semantic vector) that describes a topic of a shareable data asset. The data collection can further include a key phrase (e.g. a cryptographic key) that is unique to the consortium member (e.g., as compared to cryptographic keys associated with other members of the consortium). In some instances, the training components 500 receive input data from multiple data collections, where each data collection is associated with a different consortium member from a group of consortium members. Topic metadata from each data collection is received as input by a different rCVAE model from a group of rCVAE models (that includes the rCVAE model 510). As a result, each rCVAE model can be individually trained from the respective data of the consortium member associated with that rCVAE model.

The rCVAE model 510 receives topic metadata from a member's data collection as input and is trained to reconstruct the received topic metadata through unsupervised learning. More specifically, the rCVAE model 510 includes an autoencoder (e.g., a deep neural network) that includes the local encoder 514. The local encoder 514 is trained to transform the topic metadata into a latent vector (e.g., embedded data), and the decoder 516 is trained to transform the latent representation back into an approximation of the input topic metadata. The rCVAE model 510 is further trained to approximate the cryptographic key along with the approximation of the topic metadata. Thus, as compared to some known autoencoders that receive a conditional variable as an input, the rCVAE model 510 produces a conditional variable (the cryptographic key) as an output. In some implementations, the cryptographic key can include a continuous vector (e.g., as opposed to a one-hot encoded representation) having a predetermined (e.g., fixed) dimension. In some implementations, an embedding model (not shown in FIG. 5) can produce each ground truth cryptographic key (e.g., from a respective key phrase) for each consortium member from the consortium.

To train the rCVAE model 510, the ground truth cryptographic key can be compared to the approximated cryptographic key, and the input topic metadata can be compared to the approximated topic metadata. The foregoing comparisons can be performed using at least one error function to produce at least one error, and weights of the local encoder 514 and the local decoder 516 can be adjusted (e.g., automatically) to reduce the at least one error (e.g., based on a gradient descent associated with the at least one error). The weights of the local encoder 514 and the local decoder 516 can be adjusted iteratively as topic metadata is iteratively input to the rCVAE model 510. To cause the local encoder 514 and the local decoder 516 to be associated with a common latent space, the local encoder 514 and the local decoder 516 can be co-trained (e.g., such that respective weights of each model are adjusted concurrently or contemporaneously). Once trained, the local decoder 516 can be functionally and/or structurally similar to the decoder 306 of FIG. 3 and/or the decoder 406 of FIG. 4.

During training, the rCVAE model 510 learns parameters of a probability distribution representing the input topic metadata. More specifically, the rCVAE model 510 maps the input topic metadata to a probability distribution within a latent space and then samples from the distribution to generate new data. This latent space can be continuous, which can facilitate random sampling and/or interpolation of the probability distribution. The rCVAE model 510 can further facilitate stochastic generation by varying encodings (due to the sampling) for the same input while maintaining a constant mean and standard deviation. As a result of the foregoing, the rCVAE model 510 can produce encodings that are close together within the latent space while still being distinct, permitting interpolation and construction of new samples. A loss function (e.g., KL divergence and/or a similar divergence metric) can be used to manage the spacing of encodings within the latent space.

After the rCVAE model 510 is trained, the local encoder 514 can be split from the local decoder 516. The trained local decoder 516 can remain associated with the associated consortium member (and not other members of the consortium). The trained local encoder 514 can be used to define weights of the global encoder 504. More specifically, weights of the global encoder 504 can be parameterized through federated averaging of weights from multiple trained local encoders (including the local encoder 514) from of the multiple rCVAE models (including the rCVAE model 510). As described above, each rCVAE model can be associated with a different consortium member, and as a result of the federated averaging, the global encoder 504 can be common to each member from the consortium. Once parameterized, the global encoder 504 can be functionally and/or structurally similar to the encoder 304 of FIG. 3 and/or the encoder 404 of FIG. 4.

The training components 500 can implement the following process to train the local encoder 514, the local decoder 516, and the global encoder 504.
Input: Topics from data assets, a unique key phrase
Output: Trained Encoder and Decoder models
i. embkp: =Embedding Model (key phrase)
ii. X: ={ }, Y: ={ }
iii. for topic t in topics do:
iv. embt: =Embedding Model (t)
v. X←X U {embt}
vi. Y←Y U {embt-embkp}
vii. Create the training data with X and Y
viii. Train rCVAE model with the topics to approximate the input topics and the key phrase.
ix. Once trained, cut the rCVAE model into two halves. The first half includes the encoder and the latent space, and the second half includes the latent space and the decoder.
x. Return trained Encoder model and Decoder model.

Describing federated averaging in further detail, the approach permits a set of distinct parties (e.g., consortium members) that control their respective training data to collaborate to train a machine learning model. These parties do not share their training data with each other. The parties perform a local training process based on their private training data (e.g., to train individual rCVAE models). When their local training is completed, the parties each sends its model parameters (e.g., weights) to an aggregator, which merges the parameters (e.g., by averaging the parameters) into a common model through model fusion. The result of the federated averaging process is a model that is based on the training data of all consortium members, without sharing the training data between the consortium members.

Figure 6:
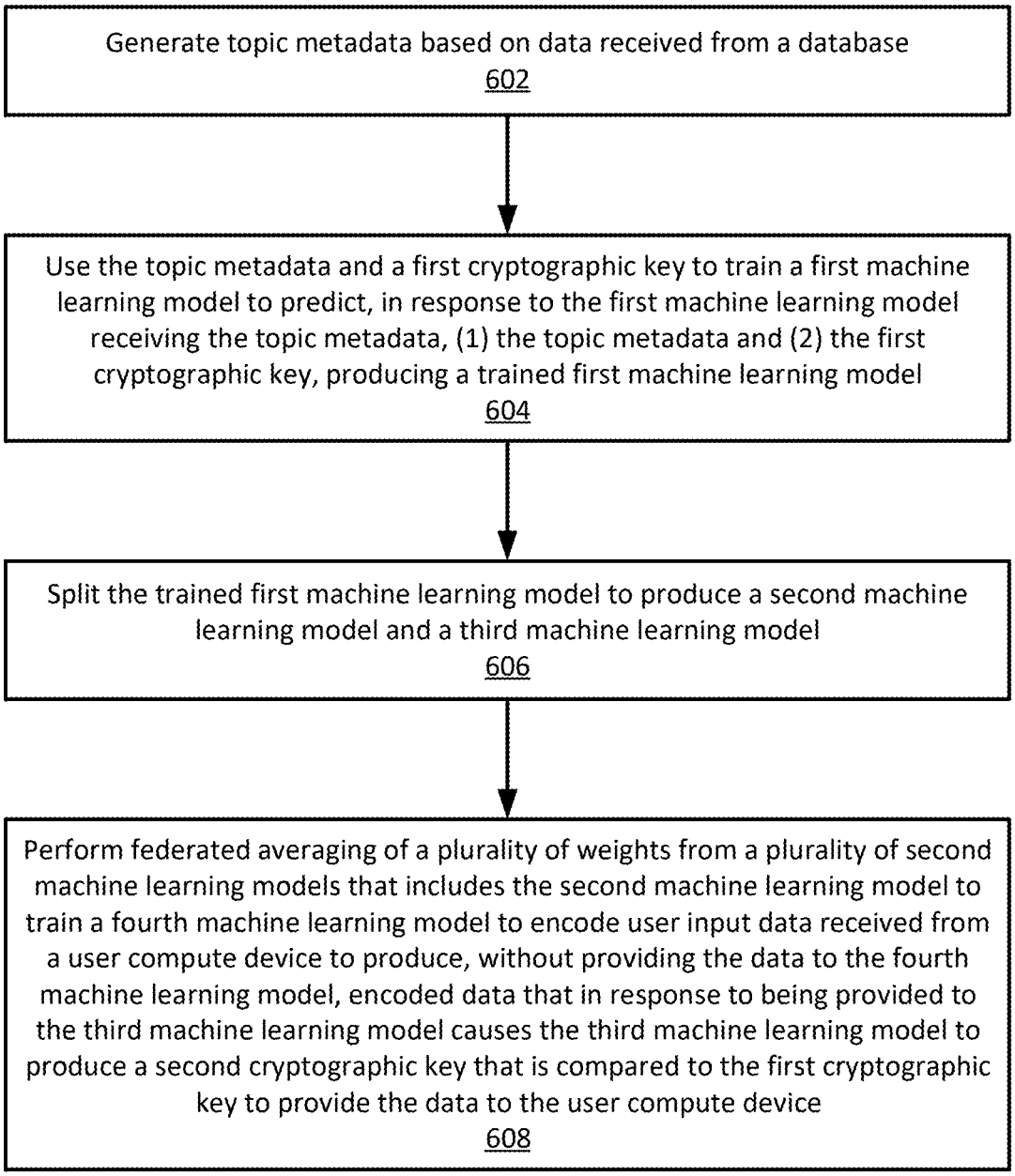
FIG. 6 shows a flow diagram illustrating a method implemented by a data access system to perform federated averaging to train a machine learning model, according to an embodiment.

FIG. 6 shows a flow diagram illustrating a method 600 implemented by a data access system to perform federated averaging to train a machine learning model, according to an embodiment. The method 600 can be implemented for example by a data access system described herein (e.g., the data access system 100 of FIG. 1). Portions of the method 600 can be implemented using a processor (e.g., the processor 220 of FIG. 2) of any suitable compute device (e.g., the compute device 201 of FIG. 2 and/or the compute devices 110 and/or 120 and/or the database server(s) 130 of FIG. 1).

The method 600 at 602 includes generating topic metadata based on data received from a database. At 604, the method 600 includes using the topic metadata and a first cryptographic key to train a first machine learning model to predict, in response to the first machine learning model receiving the topic metadata, (1) the topic metadata and (2) the first cryptographic key, producing a trained first machine learning model. The trained first machine learning model is split at 606 to produce a second machine learning model and a third machine learning model. The method 600 at 608 includes performing federated averaging of multiple weights from a group of second machine learning models that includes the second machine learning model. As a result, a fourth machine learning model is trained to encode user input data received from a user compute device to produce, without providing the data to the fourth machine learning model, encoded data. This encoded data, in response to being provided to the third machine learning model, causes the third machine learning model to produce a second cryptographic key that is compared to the first cryptographic key to provide the data to the user compute device. This comparison can be performed during the inferencing phase to grant the user computed device access to the data, whereas the comparison between the ground-truth and approximated cryptographic keys during the training phase can be performed to determine an error signal for model weight adjustment.

FIG. 7 shows a flow diagram illustrating a method 700 implemented by a data access system to cause context data to be sent to a compute device, according to an embodiment. The method 700 can be implemented for example by a data access system described herein (e.g., the data access system 100 of FIG. 1). Portions of the method 700 can be implemented using a processor (e.g., the processor 220 of FIG. 2) of any suitable compute device (e.g., the compute device 201 of FIG. 2 and/or the compute devices 110 and/or 120 and/or the database server(s) 130 of FIG. 1).

At 702, the method 700 includes receiving, at a processor of a first compute device, a latent vector from a first machine learning model associated with a group of compute devices that includes the first compute device. The method 700 at 704 includes providing, via the processor, the latent vector as input to a second machine learning model to produce a predicted topic vector and a predicted cryptographic key. The predicted cryptographic key is compared at 706, via the processor, to a cryptographic key accessible by the first compute device and not remaining compute devices from the group of compute devices, to produce a first similarity metric value. In response to the first similarity metric value being less than a first threshold value (or, alternatively, being greater than a first threshold value, crossing a first threshold value, etc.), the method 700 at 708 includes comparing, via the processor, the predicted topic vector to multiple topic vectors of a database accessible by the first compute device and not remaining compute devices from the group of compute devices, to produce multiple second similarity metric values. In response to at least one second similarity metric value from the multiple second similarity metric values being less than a second threshold value (or, alternatively, being greater than a second threshold value, crossing a second threshold value, etc.), embedded user data is received at 710, via the processor, from a second compute device from the group of compute devices. The method 700 at 712 includes causing, via the processor, context data to be sent from the database to the second compute device based on the embedded user data.

Figure 8A:
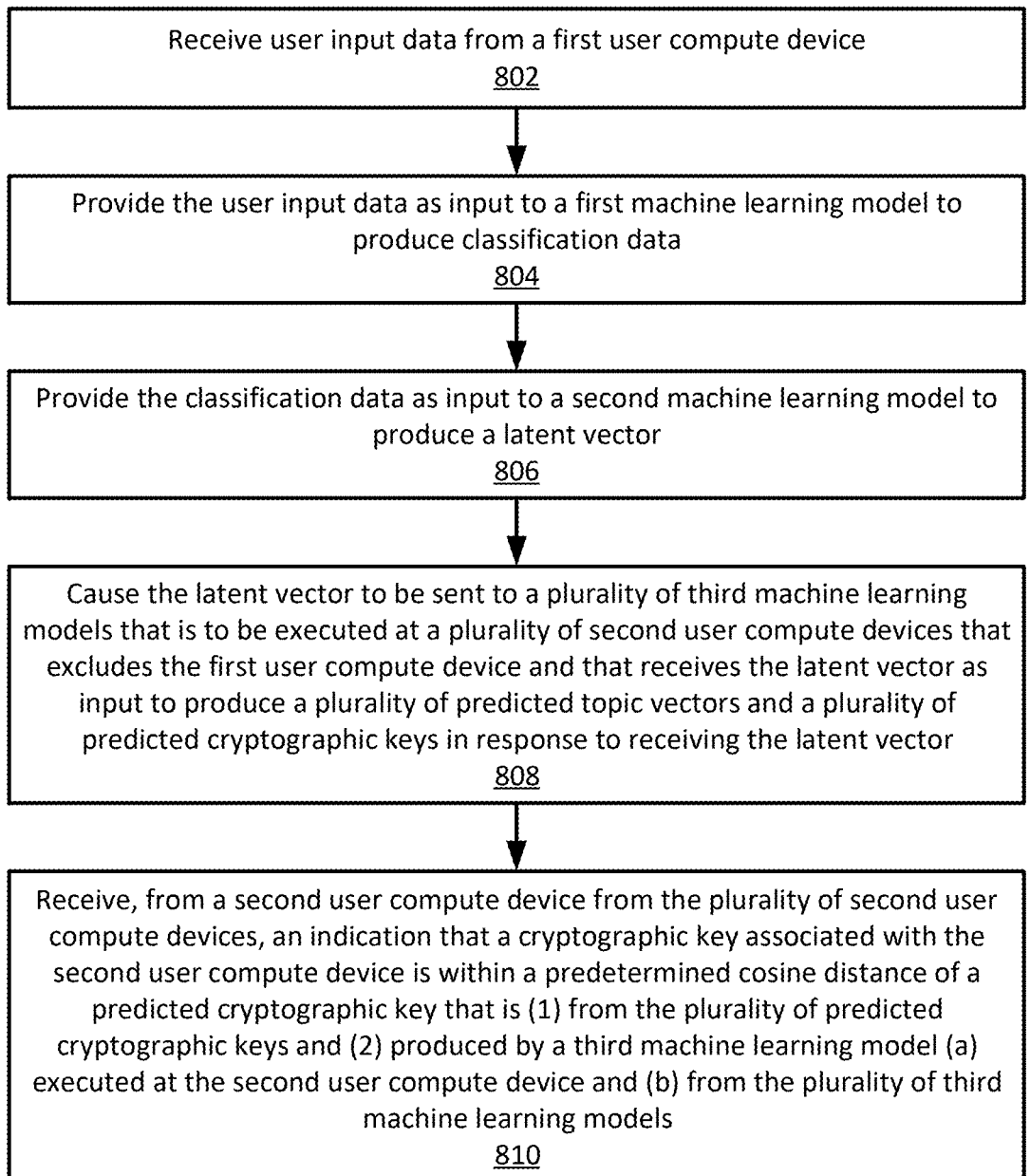
FIGS. 8A-B show a flow diagram illustrating a method implemented by a data access system to generate response data based on user input data, according to an embodiment.
Figure 8B:
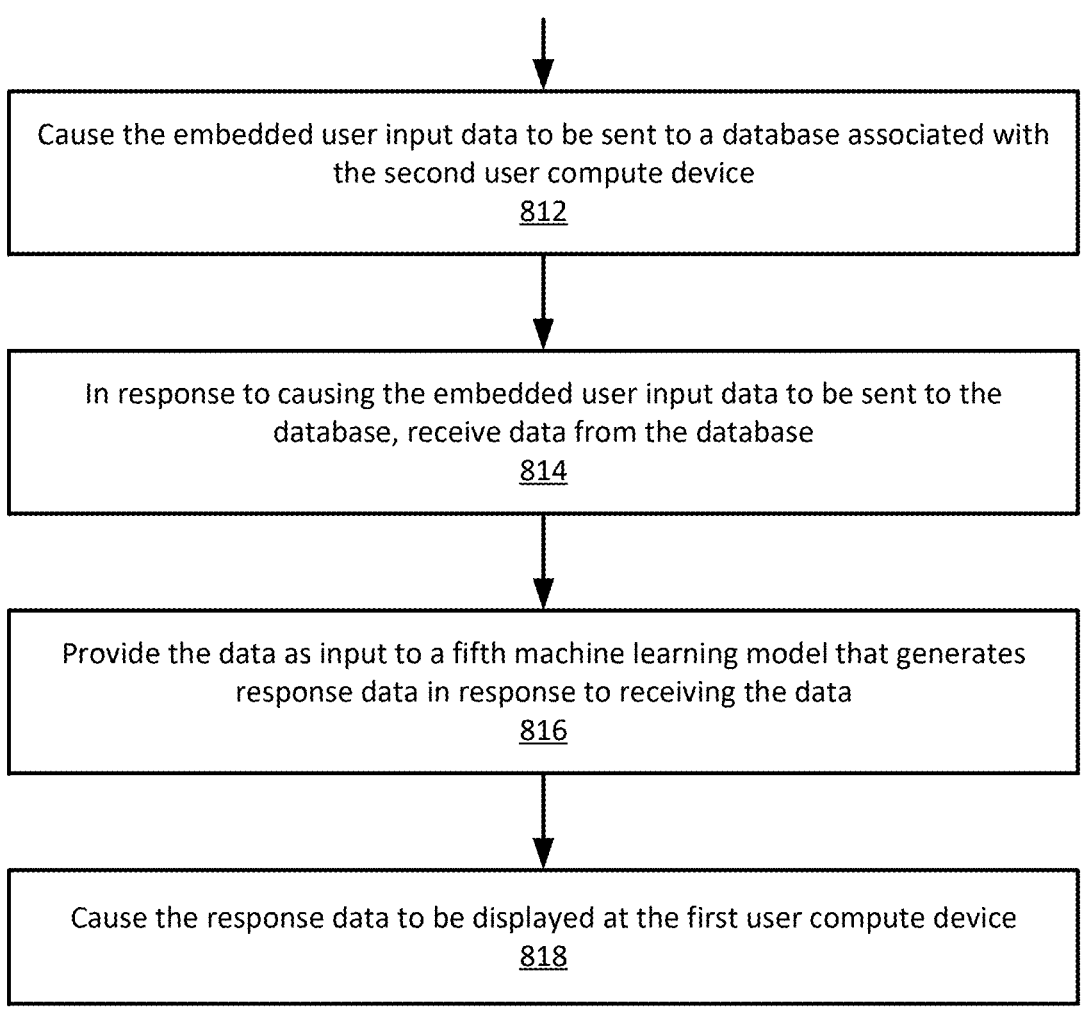

FIGS. 8A-B show a flow diagram illustrating a method implemented by a data access system to generate response data based on user input data, according to an embodiment. The method 800 can be implemented by a data access system described herein (e.g., the data access system 100 of FIG. 1). Portions of the method 800 can be implemented using a processor (e.g., the processor 220 of FIG. 2) of any suitable compute device (e.g., the compute device 201 of FIG. 2 and/or the compute devices 110 and/or 120 and/or the database server(s) 130 of FIG. 1).

At 802, the method 800 includes receiving user input data from a first user compute device and, at 804, providing the user input data as input to a first machine learning model to produce classification data. The classification data is provided as input at 806 to a second machine learning model to produce a latent vector. The method 800 at 808 includes causing the latent vector to be sent to a group of third machine learning models that is to be executed at a group of second user compute devices that excludes the first user compute device and that receives the latent vector as input to produce a group of predicted topic vectors and a group of predicted cryptographic keys in response to receiving the latent vector. Additionally, the method 800 at 810 includes receiving, from a second user compute device from the group of second user compute devices, an indication that a cryptographic key associated with the second user compute device is within a predetermined distance (e.g., cosine distance, Manhattan distance, Minkowski distance, and/or the like) of a predicted cryptographic key that is (1) from the plurality of predicted cryptographic keys and (2) produced by a third machine learning model (a) executed at the second user compute device and (b) from the group of third machine learning models. In response to receiving the indication that the cryptographic key is within a predetermined distance (e.g., cosine distance, Manhattan distance, Minkowski distance, and/or the like) of the predicted cryptographic key, at 812, the user input data is provided as input to a fourth machine learning model that produces embedded user input data in response to receiving the user input data. The embedded user input data is sent at 814 to a database associated with the second user compute device, and in response to causing the embedded user input data to be sent to the database, context data is received from the database. At 816, the context data is provided as input to a fifth machine learning model that generates response data in response to receiving the context data, and at 818, the response data is displayed at the first user compute device.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory, processor-readable medium storing instructions that, when executed by a processor, cause the processor to:
receive a first instance of topic metadata associated with stored data stored in a database;
use the first instance of topic metadata and a first cryptographic key to train a first machine learning model to predict, in response to the first machine learning model receiving the first instance of topic metadata, (1) a second instance of topic metadata and (2) the first cryptographic key, producing a trained first machine learning model;
split the trained first machine learning model to produce a second machine learning model and a third machine learning model; and
perform federated averaging of a plurality of weights from a plurality of second machine learning models that include the second machine learning model to train a fourth machine learning model to encode user input data received from a user compute device to produce encoded data without providing the stored data to the fourth machine learning model, in response to the encoded data being provided to the third machine learning model, the third machine learning model producing a second cryptographic key that is compared to the first cryptographic key to provide the stored data to the user compute device.

2. The non-transitory, processor-readable medium of claim 1, wherein:
the first machine learning model includes a reverse conditional variational autoencoder.

3. The non-transitory, processor-readable medium of claim 1, wherein:
the second machine learning model includes a local encoder model;
the third machine learning model includes a local decoder model; and
the fourth machine learning model includes a global encoder model.

4. The non-transitory, processor-readable medium of claim 1, wherein:
the second machine learning model, the third machine learning model, and the fourth machine learning model are each associated with a common latent space.

5. The non-transitory, processor-readable medium of claim 1, wherein:
the user compute device is a first user compute device;
the database is associated with a second user compute device different from the first user compute device; and
the first cryptographic key is associated with the second user compute device and not the first user compute device.

6. The non-transitory, processor-readable medium of claim 1, further storing instructions to cause the processor to:
provide the stored data as input to a fifth machine learning model to produce a data catalog that includes the first instance of topic metadata.

7. The non-transitory, processor-readable medium of claim 1, wherein:
the instructions to cause the processor to train the first machine learning model to predict the second instance of topic metadata and the first cryptographic key include instructions to cause the processor to:
train the first machine learning model to encode a concatenation of (1) the second instance of topic metadata and (2) the first cryptographic key to produce encoded concatenation data, based on a divergence metric associated with a distribution that includes the encoded concatenation data, the first machine learning model being trained to encode the concatenation of (1) the second instance of topic metadata and (2) the first cryptographic key in response to the first machine learning model receiving the first instance of topic metadata, and not the first cryptographic key, as input.

8. A method, comprising:
receiving, at a processor of a first compute device, a latent vector from a first machine learning model associated with a plurality of compute devices that includes the first compute device;
providing, via the processor, the latent vector as input to a second machine learning model to produce a predicted topic vector and a predicted cryptographic key;
comparing, via the processor, the predicted cryptographic key to a cryptographic key accessible by the first compute device and not remaining compute devices from the plurality of compute devices, to produce a first similarity metric value;
in response to the first similarity metric value being less than a first threshold value, comparing, via the processor, the predicted topic vector to a plurality to topic vectors of a database accessible by the first compute device and not remaining compute devices from the plurality of compute devices, to produce a plurality of second similarity metric values;
in response to at least one second similarity metric value from the plurality of second similarity metric values being less than a second threshold value, receiving, via the processor, embedded user data from a second compute device from the plurality of compute devices; and
causing, via the processor, context data to be sent from the database to the second compute device based on the embedded user data.

9. The method of claim 8, wherein:
the first machine learning model includes a global encoder model.

10. The method of claim 8, wherein:
the second compute device provides user input text to the first machine learning model to produce the latent vector, the embedded user data being generated from the user input text.

11. The method of claim 8, wherein:
the first machine learning model is trained based on a plurality of weights from a third machine learning model associated with the first compute device;
the second machine learning model includes a decoder model;
the third machine learning model includes an encoder model; and
the decoder model and the encoder model are co-trained within a reverse conditional variational autoencoder associated with the first compute device.

12. The method of claim 8, wherein:
the first machine learning model is trained based on a federated averaging of a plurality of weights from a plurality of encoder models associated with the plurality of compute devices.

13. The method of claim 8, wherein:
the first similarity metric value includes a first cosine distance value; and
the plurality of second similarity metric values includes a plurality of second cosine distance values.

14. The method of claim 8, wherein:
the latent vector is associated with a query from the second compute device; and
the cryptographic key is used as ground truth data to train the second machine learning model to predict the predicted cryptographic key based on the latent vector, without receiving data from the second compute device.

15. A non-transitory, processor-readable medium storing instructions that, when executed by a processor, cause the processor to:
receive user input data from a first user compute device;
provide the user input data as input to a first machine learning model to produce classification data;
provide the classification data as input to a second machine learning model to produce a latent vector;
cause the latent vector to be sent to a plurality of third machine learning models that are to be executed at a plurality of second user compute devices that exclude the first user compute device and that receive the latent vector as input to produce a plurality of predicted topic vectors and a plurality of predicted cryptographic keys in response to receiving the latent vector;

receive, from a second user compute device from the plurality of second user compute devices, an indication that a cryptographic key associated with the second user compute device is within a predetermined distance of a predicted cryptographic key that is (1) from the plurality of predicted cryptographic keys and (2) produced by a third machine learning model (a) executed at the second user compute device and (b) from the plurality of third machine learning models;

in response to receiving the indication that the cryptographic key is within a predetermined distance of the predicted cryptographic key, provide the user input data as input to a fourth machine learning model that produces embedded user input data in response to receiving the user input data;

cause the embedded user input data to be sent to a database associated with the second user compute device;

in response to causing the embedded user input data to be sent to the database, receive context data from the database;

provide the context data as input to a fifth machine learning model that generates response data in response to receiving the context data; and cause the response data to be displayed at the first user compute device.

16. The non-transitory, processor-readable medium of claim 15, wherein:

the second machine learning model is trained based on a plurality of weights from a plurality of sixth machine learning models associated with the plurality of second user compute devices.

17. The non-transitory, processor-readable medium of claim 15, wherein:

the second machine learning model is trained based on a plurality of weights from a sixth machine learning model associated with the second user compute device;

the third machine learning model includes a decoder;

the sixth machine learning model includes an encoder; and the decoder and the encoder are co-trained within a reverse conditional variational autoencoder associated with the second user compute device.

18. The non-transitory, processor-readable medium of claim 15, wherein:

the fifth machine learning model includes a large language model (LLM); and the instructions to cause the processor to generate the response data include instructions to cause the processor to add the user input data and the context data to a context window of the LLM to generate the response data.

19. The non-transitory, processor-readable medium of claim 15, wherein the predetermined distance is a first predetermined distance, the non-transitory, processor-readable medium further storing instructions to cause the processor to:

receive an indication that the classification data is within a second predetermined distance of a predicted topic vector that is (1) from the plurality of predicted topic vectors and (2) produced by the third machine learning model, the user input data being provided as input to the fourth machine learning model in further response to receiving the indication that the classification data is within the second predetermined distance of the predicted topic vector.

20. The non-transitory, processor-readable medium of claim 15, further storing instructions to cause the processor to:

cause credential data to be sent from the first user compute device to the second user compute device, the user input data being provided as input to the fourth machine learning model in further response to receiving an indication that the second user compute device validates the credential data.

\* \* \* \* \*